2 Sheets
Sheet 1

Mc Namara & Dodge.

Mower.

No 1824

Reissued Nov. 22, 1864

Witnesses

J. Henry Hill

Elijah D. Lodge

Inventor

D. S. McNamara by his Attorney

Thos. H. Dodge

2 Sheets
Sheet 2.

McNamara & Dodge.

Mower.

No 1824 Reissued Nov. 22, 1864

Witnesses
J. Henry Hill
Geo. H. Dodge

Inventor
D. S. McNamara
by his Attorney
Thos. H. Dodge

UNITED STATES PATENT OFFICE.

DAVID S. McNAMARA, OF TROY, NEW YORK.

IMPROVEMENT IN HARVESTERS.

Specification forming part Letters Patent No. 17,691, dated June 30, 1857; Reissue No. 1,824, dated November 22, 1864.

*To all whom it may concern:*

Be it known that I, DAVID S. McNAMARA, formerly of North Hoosick, in the county of Rensselaer and State of New York, but now of Troy, in the said county and State, have invented certain new and useful Improvements in Harvesters; and I do hereby declare that the following is a full, clear, and exact description of the same, reference being had to the accompanying drawings, making a part of this specification, and in which—

Figure 1:
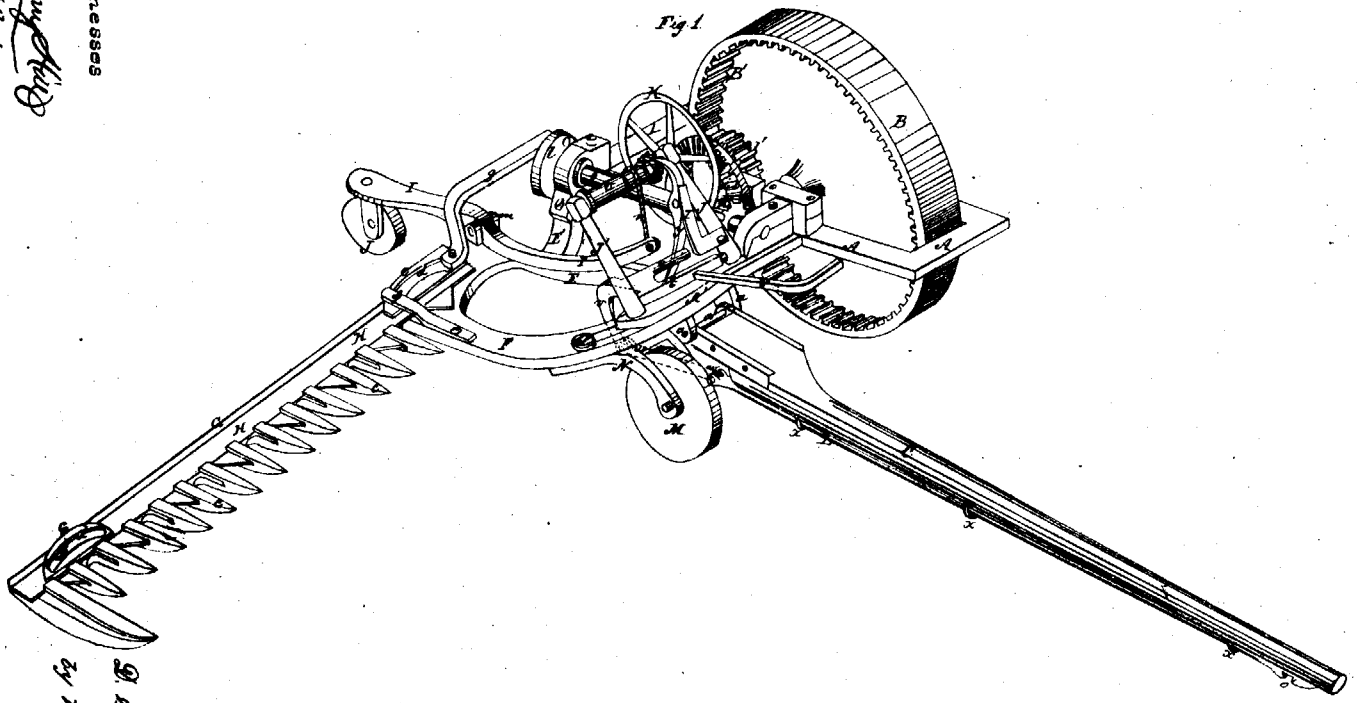
Figure 2:
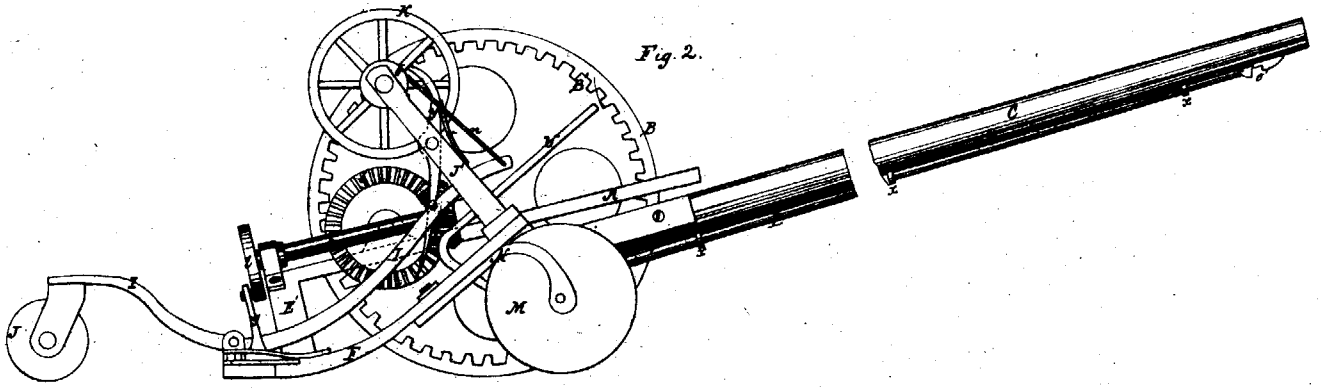
Figure 1:
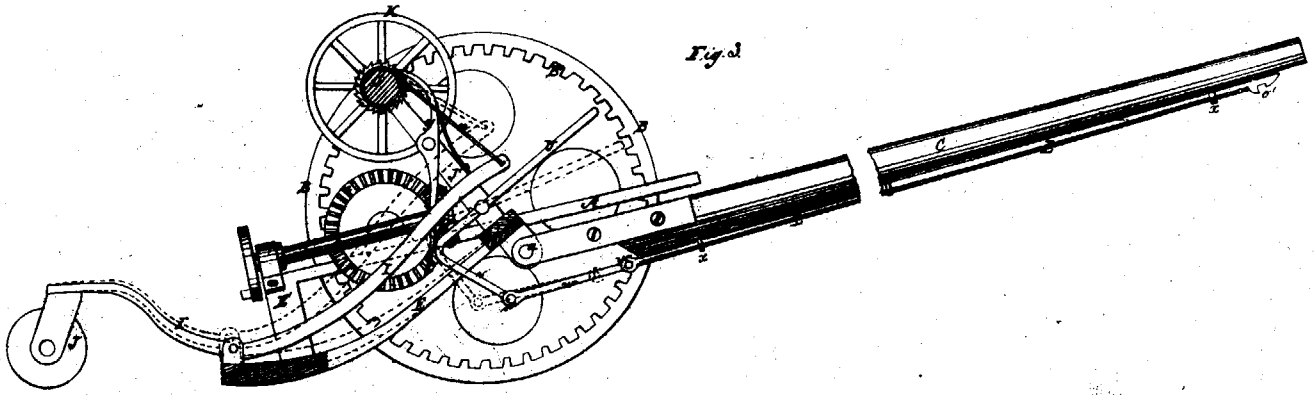

Figure 1 repesents a perspective view of my said improved harvester. Fig. 2 represents an inside view without the cutting apparatus and finger-beam, as seen in Fig. 1. Fig. 3 represents a section of Fig. 1, taken just inside of the tongue.

In the drawings, A represents the main frame, which is supported by the large wheel, B, upon the inner surface of which are cogs or teeth B′.

C is the tongue by which the machine is drawn forward, and which is supported at the rear by a hinge, as seen at *a a*, the latter being ear-pieces, which project down from the extension-piece A′ of the main frame A.

From the rear of the extension-piece A′ projects the curved brace E and the shoe part F of the main frame, to which the heel of the finger-beam G is fastened.

The rear of main frame A and the brace E are connected by a riser, E′, which serves the purpose of a brace, and also as a support for the rear bearing of the crank-shaft *b*, whose front bearing rests upon the piece A′. The sickle or cutter H in this instance is placed above the cutter-bar, its teeth working through the slotted open guards *c c*, and having a curvilinear motion when in operation, and which is effected by the curved slots *d d* in pieces *e e* fastened to the cutter-bar, in connection with the pins *f f* in the finger-bar.

Motion is imparted to the cutter from the crank-shaft *b* by means of the pitman *g*. Crank-shaft *b* is operated from the main wheel D by means of the bevel-gears *h* and *i*, and the small cog-wheel *j*. The bevel-wheel *i* and cog-wheel *j′* are both upon the shaft *k*, the cog-wheel *j′* taking into the teeth B′ in the rim of wheel B and the bevel-gear *i* working into the bevel-wheel *h* on the front end of the crank-shaft *b*. The frame which supports the crank-shaft does not extend back as far as the rear of the shoe part of the main frame, which supports the heel of the finger-beam, whereby free space is left for the operation of the balance-wheel *l* and its wrist-pin, together with the outer end of pitman *g*.

I is a curved lever whose fulcrum is at *m* on the shoe part of the main frame, to which the heel of the finger-beam is attached.

To the rear end of lever I is connected the swivel-wheel J, while a chain or rope, *n*, connects the front end of said lever with a windless-shaft, *o*, which has its bearings in the ends of the uprights J′ J′, the uprights being properly fastened to a base-piece supported on the piece A′. A hand-wheel, K, and ratchet *p* are fastened upon and turn with shaft *o*.

To one of the uprights J′ is pivoted a long pawl, *y*, the upper end of which is confined to the ratchet-wheel by a spring, *r*.

It will be seen that by turning the shaft *o* the chain or rope *n* will be wound onto the shaft, and that the front end of lever I can be elevated and retained at any required height, pawl *y* taking into ratchet-wheel *p*. It will be further observed that by raising the front end of lever I the finger-bar G and cutter H will both be raised, and that consequently the cutter can be elevated and retained at any desirable position above the ground either to pass obstructions or to vary the cut of the stubble.

In the lower ends of the uprights J′ J′ a shaft, *t*, has its bearings. This shaft has a lever, U, attached to it, said lever projecting out forward at right angles, or nearly so, to the shaft, while another lever, *v*, is attached to the opposite side of said shaft. Lever *v* is curved downward, and its end connected by a link, *w*, to a rod L, which is fitted and allowed to slide freely in guides *x*, fastened to the under side of tongue C.

To one side of lever *v* a spur or projecting arm, *q*, is attached, and this spur or arm extends under the front end of lever I and in front of the lower end of the pawl *y*, as indicated in the drawings. By depressing lever U the shaft *t* will be turned, and the spur or projecting arm *q* will strike against the lower side of lever I and raise it. This lever is placed within reach of the foot of the driver, by whom it can be actuated when necessary.

The yoke-ring in which the end of the tongue is placed, as usual, fits in a recess, $o'$, in the rod L, and when the team is backed the shaft $t$ will be actuated through the medium of link $w$ and lever $v$, whereby lever I may be raised either by the driver depressing lever $v$ with his foot, turning hand-wheel K, or backing the team.

By this simple device the sickle, so far as adjustability is concerned, is placed completely under the control of the driver. If the sickle becomes clogged or choked by the backward motion of the team, it will be raised before the machine is acted upon, and a few strokes of the sickle will cause it to clear itself. This is a great advantage, because sickles are liable to clog or choke, and considerable time has hitherto been consumed in clearing them.

In case any obstruction lies in the path of the sickle the latter may be raised by the driver by means of the foot-lever U, or by the hand-wheel K, as before described, and that, too, without stopping the machine or checking its movement, and in case it becomes necessary at any time to lower or drop the sickle entirely it may be done by depressing the lever U sufficiently to cause the spur or arm $q$ to actuate the lower end of the pawl $y$, so that its upper end will be thrown free from ratchet-wheel $p$.

In all mowing-machines it is desirable to have the shoe which supports the heel of the finger-beam run close to the ground; but when the said shoe and finger-beam are both allowed to "drag" heavily upon the surface of the ground the draft of the machine is greatly increased. Again, when in operation the cut grass is liable to drop over and clog up the heel of the cutter-bar unless rolled or pressed down in advance thereof.

To obviate the foregoing and other objections, I apply a small leading and supporting wheel, M, to the front of the shoe part of the main frame in such a manner that it will run over and press down the cut grass in advance of the heel of the cutter and finger-bars, and the bearing part of the shoe to which the heel of the finger-beam is attached. Wheel M is journaled to arm-piece N, which in turn is fastened to the under side of the inclined shoe part F of the main frame by means of bolt O, which passes through a slot in the elevated part of F, whereby wheel M can be adjusted to carry the shoe part F of the main frame and finger-beam at any desired height from the surface of the ground. Bolt O has a nut to hold it in place. (See the drawings.) The adjustment is easily effected by simply moving arm-piece N forward or back, as may be desired. Wheel M enables the finger-beam and cutting apparatus to surmount obstacles, ridges, and slight elevations in the surface of the ground with great ease. It also greatly facilitates the passage of water-furrows.

The main frame is made so as to droop in the rear and toward the standing grass, whereby the finger-beam is brought down to the ground. This feature, in connection with the use of a hinged tongue and the rear caster-wheel and its lever, renders the machine peculiarly adapted to mowing grass, since the finger-beam easily conforms to the inequalities of the ground, and that, too, without liability of catching and dragging the grass cut by a previous swath, while at the same time the finger-beam can be easily adjusted to cut high or low.

The machine may be applied to either harvesting grain or grass.

I do not claim broadly raising the cutter-bar of harvesters by means of a lever, for various arrangements have heretofore been devised for such purpose.

Having described my improvements, what I claim as of my invention, and desire to secure by Letters Patent, is—

1. The combination of a pointed or hinged lever and caster-wheel with the drooping end of the main frame and finger-beam of a harvester, when arranged in relation to said main frame and finger-beam substantially as and for the purposes set forth.

2. The combination of lever I, frame A, and caster-wheel and leading-wheel, substantially as and for the purposes set forth.

3. An adjustable leading and supporting wheel, in combination with the shoe part of the main frame, which supports the heel of the finger-beam in a mowing-machine when arranged so as to run directly in advance of the heel end of the finger-beam and cutter-bar and the bearing part of the shoe, and when the axis of said wheel is rigidly connected with the main frame, substantially in the manner and for the purpose herein set forth.

4. The combination and relative arrangement of frame A, finger-beam G, lever I, caster-wheel J, and leading-wheel M, substantially as shown and described.

5. The combination and arrangement of the main frame, finger-beam, shoe part F of the main frame, and crank-shaft, substantially as and for the purposes set forth.

6. Connecting the shaft T by means of the arm and link with the rod placed at the under side of the draft-pole and connected with the yoke-ring, substantially as described, for the purposes set forth.

DAVID S. McNAMARA.

Witnesses:
FRANKLIN SCOTT,
CHAS. H. ADAMS.